United States Patent [19]
Wolfer et al.

[11] Patent Number: 4,899,594
[45] Date of Patent: Feb. 13, 1990

[54] DEVICE FOR MEASURING THE CUTTING FORCES ON MACHINE TOOLS

[75] Inventors: Peter Wolfer, Kleinandelfingen; Hans P. Pfeifer, Andelfingen, both of Switzerland; Günter Spur, Berlin, Fed. Rep. of Germany; Jan C. Siebert, Berlin, Fed. Rep. of Germany; Klaus-Jürgen Benzinger, Berlin, Fed. Rep. of Germany

[73] Assignee: Kistler Instrumente, Winterthur, Switzerland

[21] Appl. No.: 288,446

[22] Filed: Dec. 22, 1988

[30] Foreign Application Priority Data

Dec. 22, 1987 [EP] European Pat. Off. ........... 8711903.1

[51] Int. Cl.4 .......................... G01L 5/16; B23Q 17/09
[52] U.S. Cl. ..................... 73/862.06; 73/104
[58] Field of Search ............... 73/862.06, 862.04, 104, 73/1 R, 1 B, 78; 340/680

[56] References Cited
U.S. PATENT DOCUMENTS 3,640,130 2/1972 Spescha et al. ............... 73/862.04
4,671,147 6/1987 Komandur et al. ............. 73/104 X
4,757,307 7/1988 Keramati et al. .............. 340/680

FOREIGN PATENT DOCUMENTS 3440670 5/1986 Fed. Rep. of Germany ... 73/862.06
2606147 5/1988 France ............................ 73/1 B Primary Examiner—Charles A. Ruehl
Attorney, Agent, or Firm—Barnes & Thornburg

[57] ABSTRACT

A device for measuring at least one force component during cutting operations on workpieces with machine tools, including a dynamometer with measuring elements, integrated in a base module of a modular toolholder so that it is directly engaged with the cutting tool. The base module may be combined with various clamping and mounting modules to allow adaptation to standardized clamping systems of different machine tools, and to standard tools. The integration of the dynamometer in the toolholder and the direct engagement between cutting tool and dynamometer gives a compact unit with only small or no force shunts, making possible precision measurements. The device is therefore suitable for, among other duties, calibrating existing monitoring sensors of machine tools and for comparative functional tests on different machine tools. Measuring and evaluation electronics may be integrated in the device, wholly or in part. Furthermore holes may be provided in the device for supplying coolant, and dynamometer connecting cables.

14 Claims, 3 Drawing Sheets

DEVICE FOR MEASURING THE CUTTING FORCES ON MACHINE TOOLS

BACKGROUND AND SUMMARY OF INVENTION

The invention relates generally to a device for measuring at least one force component during cutting operations on machine tools, and more particularly to the use of such a device for calibrating existing monitoring sensors on machine tools.

In machine tool cutting operations, process forces are set up between the workpiece and tool, resulting in deformation. Between this deformation and the force causing it, there is a correlation. Furthermore, measuring the process forces has assumed special importance in the automation of cutting operations. When the measured process forces deviate outside the usual range in continuous or cyclically repetitive Processes, it can be deduced that the process is no longer proceeding as it should and that correction is needed. However, this deduction is valid only if the measuring accuracy and functional reliability of the sensors employed for monitoring the process forces can be verified from time to time. In other words, the measuring system has to be calibrated with a very precise and reliably functioning measuring instrument.

The prior art force measuring systems measure the forces or partial forces within a machine component or between two machine components. Generally such arrangements cannot be fitted or dismantled without substantial modifications to the machine. A measuring arrangement of this kind is described in Swiss Pat. No. 502,590. It consists of four piezoelectric force measuring elements between two force introduction plates for measuring forces and moments, making possible a clear-cut division of the introduced force into its three spatial components. This measuring arrangement can be placed typically between two moving machine parts, to detect the forces and moments acting at this point. Another measuring arrangement effective in a plane between two machine parts is described in German Patent No. 3,440,670. Here again, four pressure sensitive measuring cells are arranged in a rectangle in an intermediate plate, and at least one shear force component, acting typically on a lathe tool, may be determined by an arithmetic unit. Also known is the provision in a machine part of holes, into which transducers are introduced in the form of measuring pins detecting the material stresses acting longitudinally or transversely to the holes. Such configurations are described for example in German Patent No. 3,407,620 and U.S. Pat. No. 4,412,456. Only partial forces can be determined with these arrangements, moreover they do not allow the detection of defined force components. On the contrary, they constitute monitoring sensors serving mainly for routine monitoring of the machine function.

Another disadvantage of all known measuring arrangements is the need to place them relatively far from the cutting tool. This renders measurement of the actual forces at the tool point difficult or impossible, because the force shunts existing are very hard to control. Also the superimposition of considerable inertial forces must be taken into account. For these reasons, precise measurements of the forces acting at the point of application of the cutting tool, especially their components, has been possible hitherto imperfect. Also, the known multicomponent force measuring systems were not easily adaptable to the particular machine tool and has to be adapted individually to the particular cutting tools, for example lathe tools.

In view of these shortcomings of the known measuring arrangements, the invention is aimed at providing a device for precise measurement of the cutting forces directly on the cutting tool and adaptable to different tools and machine tools.

According to the invention this aim is achieved by integrating a dynamometer in a base module of a modular toolholder, to engage a tool. This base module, with the dynamometer integrated in it, is universally usable. The necessary adaptation to a particular machine tool and tools is effected by appropriately designed interfaces. The base module is combinable preferably with a clamping module having an interface for bracing the tool against the dynamometer, and with a mounting module having an interface for mounting on a carrier on the machine tool side. The clamping and mounting module can therefore be of standard design, for interaction with different standard tools and standardized machine tool carrier systems. In particular, according to a development of the invention, the mounting module may consist of a mounting flange, such as a straight shank or clamping device, fixable on a turret carrier on the machine tool side. The dynamometer (to be understood as an electromechanical transducer arrangement for measuring forces and moments) is placed in the base module of the toolholder so that a tool, such as a lathe tool, may be brought into direct engagement with it. In this way force shunts and measuring errors resulting from these are avoided, assuring the prerequisite for high-precision force measuring. One account of the many possible combinations with different clamping and mounting module, there is moreover the possibility of quantity production of at least the base module of the holder with the dynamometer integrated in it.

Furthermore the high-precision direction of the forces of moments acting on the tool means that tee dynamometer arrangement is suitable for calibrating the monitoring sensors Provided on the machine tool, or for verifying the proper functioning of these. This can be accomplished typically by mounting a dynamometer arrangement according to the invention on the machine tool, and comparing measuring signals yielded by the monitoring sensors of the machine while machining a workpiece with the signals from the dynamometer. In addition, the toolholder with integrated dynamometer is suited for determining significant process parameters in the machining of new materials and/or when using new cutting tool materials, also for direct tool monitoring on larger machines. Moreover the cutting behavior of different machine tools can be compared, because meaningful comparative measurements can be made by virtue of the absence of different force shunt resulting from the machine designs.

The measuring elements of the dynamometer may be sensitive to two or all force components Fx, Fy or Fz. Also, a coolant supply system is integrated in the holder. According to a further development of the invention, the tool is held in the holder so that its cutting plane passes through the centerline of a mounting device provided on the holder or shank. Measuring or evaluation electronics may be integrated in the holder at least in part. The measuring elements are accommodated in the base module preferably so that they are sealed against ingress of coolant and other aggressive media or liquids. A connecting cable for the dynamometer signals may also be integrated in the holder. To enable further toolholders according to the invention to be positioned in the immediate proximity, they should have standard dimensions.

Another aspect of the invention is that it offers a procedure for calibrating the electromechanical monitoring sensors Of machine tools by comparing the signals from a dynamometer arrangement according to the invention fitted on the machine tool with the signals from the monitoring sensors under equal cutting conditions.

Other objects, advantages and novel features of the Present invention will become apparent from the following detailed description of the invention when considered in conjunction with the accompanying drawings.

DETAILED DESCRIPTION OF THE DRAWINGS

Figure 1:
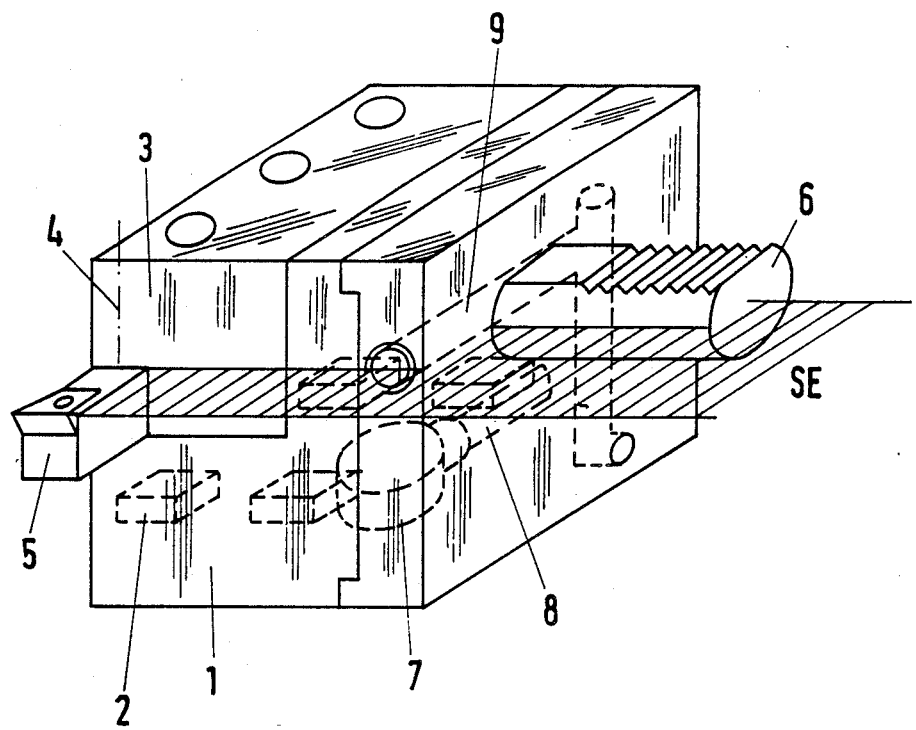
FIG. 1 is a partly schematic perspective view of a dynamometer and a toolholder of modular design according to the present invention.
Figure 2:
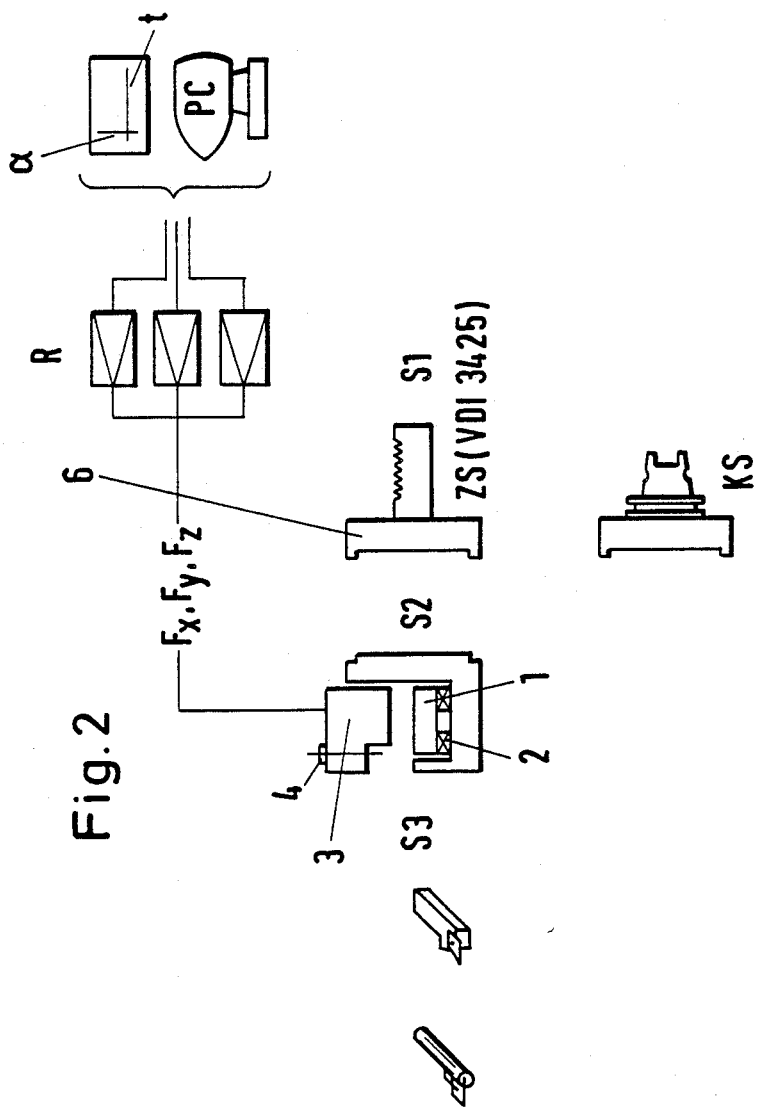
FIG. 2 is a schematic view of the dynamometer/toolholder arrangement with disassembled mounting parts, showing the modular design, and with a device for electronic processing of the measuring signals.

According to FIG. 1, the toolholder is a modular unit consisting of a base module 1 with a dynamometer integrated in it and having, in this case, four measuring elements 2, a clamping module 3 engaging the tool 5 to be braced against the base module and the dynamometer, and a mounting module 6 through which the toolholder can be fixed to a carrier or support on the machine, not shown. In the embodiment shown, the mounting module 6 is a so-called mounting flange, about which more will be said in connection with the description of FIG. 2. The tool clamping module 3, base module 1 and mounting module 6 form interfaces S1, S2 and S3, as shown in FIG. 2. The interface between the mounting module 6 and the support on the machine tool not show, typically a turret, is designated S1, the interface between base module 1 and mounting module 6 is designated S2, and the interface between base module 1 and clamping module 3 is designated S3.

Furthermore a cooling supply system is integrated Preferably in the toolholder. For this purpose, a hole 9 may be provided in the mounting module 6, from the exit of which (not shown) a hose may be led to the tool cutting edge 5. Moreover in FIG. 1, an integrated cable connection 7 with cable 8 is sealed against ingress of coolant and other liquids and through which the measuring signals may be led off from the measuring elements 2. Alternatively, the electric cable connections may also be positioned outside the zone of the holder affected by the coolant. In any case, it must be assured that no liquids can get inside the base module 1, especially around the dynamometer, otherwise the electrical insulation and the functional efficiency of the electrical contact may be impaired.

Straining screws (not shown) may be provided, to preload the measuring elements 2 with a suitable force. For bracing the tool 5 against the dynamometer, the clamping module 3 may have clamp screws 4. In the embodiment illustrated, the tool 5 is fixed to the side of the clamping and base modules 3, 1, but it might also be fixed at any suitable point along the broad side of the tool holder.

As illustrated, the mounting module flange 6 surrounds a straight shank ZS, whose centerline should lie preferably in a plane passing through the cutting plane SE of the tool 5. In this way, unwanted force effects due to the geometry of the cutting operation are avoided. Such effects may influence the cutting operation especially with workpieces of small diameter. The straight shank ZS serves to fix the holder on the carrier or turret of the machine tool, and may conform to the German VDI standard 3425. The mounting module 6 may be joined to the turret by clamping system KS also, as shown in FIG. 2, though other mounting modules are possible as well. The toolholder ought to be as small as possible, preferably with standard dimensions, so that several such toolholders may be placed in immediate proximity for practical application. Moreover the base module 1 may take the form of a measuring Pin according to the arrangement in German Patent No. 3,407,620.

FIG. 2 shows the modular design of the toolholder. S1, S2 and S3 are interfaces, i.e., detachable connections between the carrier or turret (not shown) of the machine tool and the mounting module 6 (S1), between the mounting module 6 and the universal base module 1 (S2), and between the base module 1 and the clamping module 3 (S3). As mentioned previously, these interfaces may take very different forms. The clamping module 3 is provided preferably with one or more clamp screws 4 for fixing external and internal lathe tools to the toolholder.

The signals provided by the measuring elements 2 of the dynamometer, for example for one or more of the three force components Fx, Fy and Fz, can be processes on an arithmetic unit R and led to a computer PC. Significant mechanical correlations, such as the dependence of the cutting force on the cutting speed and similar, can then be presented on visual display unit D. Not shown furthermore is the possibility of integrating the electronics, at least partly, in the toolholder, which among other advantages reduces the susceptibility to disturbances associated with external cable connections.

Figure 3:
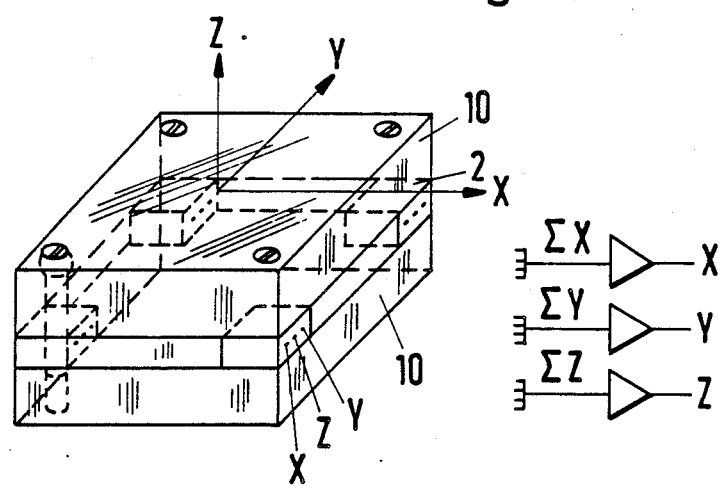
FIG. 3 is a perspective partial view of an embodiment in the form of a dynamometer suitable for integration in the toolholder.

FIG. 3 shows a typical arrangement of four measuring elements as a dynamometer, as described in previously mentioned Swiss Patent No. 502,590. The dynamometer includes force introduction plates 10, the measuring elements 2 sensitive in the various axes x, y, z, and preloading screws 11 placing the measuring elements under a suitable preload. This preload may be so high that shear forces too can be measured in the x and y directions. If only the force components in the three stated directions (x, y, z) are to be measured, i.e, Fx, Fy, Fz, the corresponding signal outputs of the four measuring cells 2, likewise designated x, y, z in FIG. 1, may be parallelly channel and amplified individually, as shown in the diagram on the right of FIG. 3. If not only forces but moments also are to be measured, appropriate calculations are necessary, which might be performed by an arithmetic unit for instance, as shown in FIG. 2. For the fundamentals governing these calculations, Swiss Patent No. 502,590 may be referred to for example.

Three-component measuring elements 2 do not have to be employed in every application. Sometimes it is enough to measure a single component to obtain sufficient information about the forces active at the tool application point. Needless to say, a single-component measuring element is cheaper than a multicomponent measuring element. Also four force measuring elements are not always needed. Especially in lathe operations, three of these elements are often sufficient, because the force application point changes its position in relation to the dynamometer only within narrow limits. Moreover an arrangement of four measuring elements between two force introduction plates constitutes a special embodiment of a dynamometer. Other configurations are possible, however, integrating the individual force measuring elements in the base module 1 of the toolholder in a different, less rigid manner. The individual measuring elements may embody Piezoelectric or other force and strain measuring technologies familiar in themselves, such as strain gauges.

Figure 4:
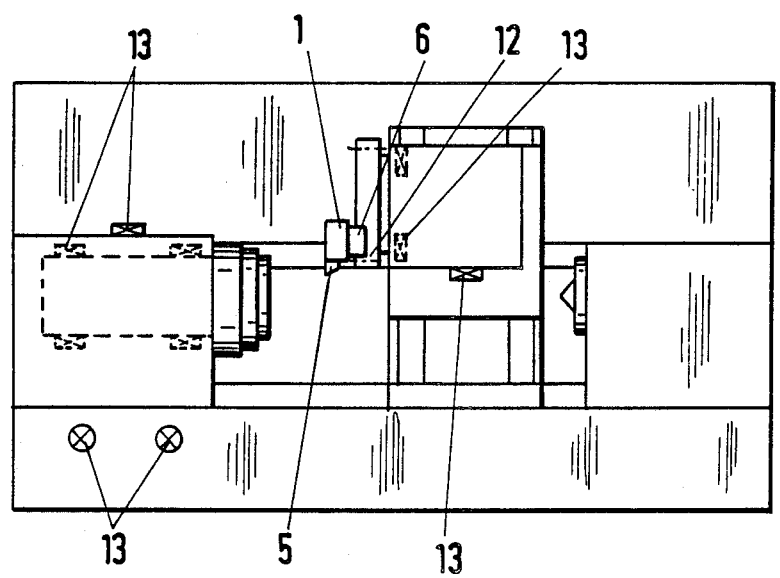
FIG. 4 is a plan view of an automatic lathe with a toolholder/dynamometer arrangement according to the invention, illustrating the calibration of existing monitoring sensors.

A calibration procedure for the monitoring function on machine tools is described with reference to FIG. 4. An automatic lathe is shown, fitted with various monitoring sensors 13. Mounted on its turret 12 is the toolholder/dynamometer according to the invention, with the lathe tool 5. The monitoring sensors 13 may be hole sensors (longitudinal and lateral measuring pins) as previously mentioned, measuring material stresses. Also monitoring sensors in the form of load washers may be arranged between the turret and the slide. From time to time the monitoring sensors need calibrating. This calls for the precise calibrating instrument, measuring the occurring forces as close as possible to the tool. This function can be performed excellently by the toolholder/dynamometer. After mounting the dynamometer on the machine by the mounting module 6 of the holder, a trial workpiece is machined with the sensors 13 switched on. By comparing the precise measuring signals of the dynamometer with the signals from the sensors 13, the function of the sensors 13 can be assessed, or they can be calibrated.

With this invention, a new generation of cutting force dynamometers has been created, possessing high operational reliability and simple to use. They can be easily adapted to a wide variety of standard tool mounting systems on the machine side and fitted with a great variety of standard tools, by virtue of their modular design. Through the integration of the electromechanical measuring part in the toolholder, a unit is created consisting of toolholder, dynamometer and tool, making possible force introduction by short and direct path, accompanied by no or only minimal force shunts exactly controllable at least. With the object of further minimization of force shunts, welded holder designs have proved particularly beneficial. The dynamometer arrangement may be employed to verify monitoring sensors on machine tools, to determine significant process parameters when cutting new materials with new-type cutting materials, or to compare the cutting behavior of different machine tools. On bigger machines, they can be used for tool monitoring also. The modular design and the standardization allow quantity production, especially of the universally usable base module of the holder with integrated dynamometer.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Device for measuring at least one force component in cutting operations on machine tools comprising:
   a modular-assembled toolholder connecting a cutting tool to a machine;
   a base module of said toolholder includes a dynamometer integrated therein;
   a clamping module of said toolholder for clamping a cutting tool at a first interface with said base module against said dynamometer; and
   a mounting module of said toolholder joined at a second interface with said base module for mounting said toolholder to said machine.

2. Device according to claim 1, wherein said dynamometer includes measuring elements for sensing three orthogonal forces components.

3. Device according to claim 1, wherein said dynamometer includes measuring elements for sensing two forces components.

4. Device according to claim 1, wherein said toolholder includes a coolant supply system integrated therein.

5. Device according to claim 4, including means for sealing said dynamometer against ingress of coolant from said coolant supply system.

6. Device according to claim 1, wherein said base, clamping and mounting modules are configured such that said cutting tools cutting plane passes through a centerline of a mounting element of said mounting module.

7. Device according to claim 6, wherein said mounting element includes a straight shank to be received on a turret carrier on said machine.

8. Device according to claim 6, wherein said mounting elements includes a clamp to be received on a turret carrier on said machine.

9. Device according to claim 1, wherein measuring and evaluation electronics are at least partially integrated into said base module.

10. Device according to claim 1, including cables connected to said dynamometer and integrated in said base module.

11. Device according to claim 1, wherein said toolholder has standard dimensions compared to other toolholders for said machine.

12. Device according to claim 1, wherein said dynamometer includes piezoelectric measuring elements.

13. Device according to claim 1, wherein said mounting module includes a straight shank to be received on a turret carrier on said machine.

14. Device according to claim 1, wherein said mounting module includes a clamp to be received on a turret carrier on said machine.

* * * * *